United States Patent [19]
Mahood

[11] Patent Number: 5,679,274
[45] Date of Patent: Oct. 21, 1997

[54] CIRCUIT AND METHOD FOR CONTROLLING ELECTRICAL HEATER IN A DISTILLER

[75] Inventor: Michael A. Mahood, Ontario, Canada

[73] Assignee: The West Bend Company, West Bend, Wis.

[21] Appl. No.: 645,551

[22] Filed: May 13, 1996

[51] Int. Cl.$^6$ .................................................. H05B 1/02
[52] U.S. Cl. ................. 219/492; 219/508; 219/519; 219/497; 219/481; 203/2; 203/10; 202/160
[58] Field of Search .......................... 219/497, 481, 219/492, 493, 505, 506, 508, 519; 202/163–170, 160; 203/2, 10, 27

[56] References Cited

U.S. PATENT DOCUMENTS

| | | | |
|---|---|---|---|
| 3,278,395 | 10/1966 | Rubinowitz | 202/83 |
| 3,935,077 | 1/1976 | Dennison | 202/83 |
| 4,052,267 | 10/1977 | McFee | 202/186 B |
| 4,110,170 | 8/1978 | Kirschman et al. | 202/160 |
| 4,269,663 | 5/1981 | McFee | 202/185 B |
| 4,622,102 | 11/1986 | Diebel | 202/185.3 |
| 4,818,344 | 4/1989 | Glucksman | 202/176 |
| 4,861,435 | 8/1989 | Sweet, Jr. | 202/180 |
| 5,193,560 | 3/1993 | Tanaka et al. | 134/56 R |
| 5,304,286 | 4/1994 | Palmer | 202/167 |
| 5,348,623 | 9/1994 | Salmon | 203/1 |

*Primary Examiner*—Mark H. Paschall

[57] ABSTRACT

The disclosure involves a countertop distiller for home use. Such distiller is of the type including a condensing coil and an electrically-powered water heater. A method for controlling power flow to the heater includes the steps of activating a timer circuit to energize the heater, increasing the temperature of the coil and bypassing the timer circuit when the coil temperature increases to a predetermined value. The heater is de-energized when the water in the raw water container is substantially depleted and the heater temperature increases to a predetermined value because of such depletion. A new electrical circuit for a countertop distiller is also disclosed.

12 Claims, 4 Drawing Sheets

CIRCUIT AND METHOD FOR CONTROLLING ELECTRICAL HEATER IN A DISTILLER

FIELD OF THE INVENTION

This invention is related generally to liquid purification and, more particularly, to separation of water from impurities using water distillation.

BACKGROUND OF THE INVENTION

At least reasonably-pure drinking water is an absolute necessity of life and clean, fresh-tasting drinking water is one of its pleasures. Most persons in well-developed countries like the United States, for example, having continuing access to safe drinking water. But even in areas having water suitable for human consumption, such water may contain minerals, e.g., iron and calcium, and/or chemicals and other substances.

While such non-water constituents may not be harmful to humans, they often impart a taste or odor to the water which some consider unpleasant. And normally-high-quality drinking water sometimes contains bacteria or other microorganisms which may impart a bad taste to the water or otherwise impair its quality. Often, such an eventuality results from a temporary deficiency in the water treatment facility. And even if pure, taste-free, odor-free water is readily available, distilled water is useful in steam irons, auto engine cooling systems and the like where it is desirable to avoid mineral deposits.

One well-known approach for separating water from impurities is distillation. Distillation involves boiling water to form water vapor and then cooling the vapor to a temperature below the condensation temperature. The resulting liquid, sometimes referred to as condensate, is collected for drinking or the like. Distillation separates pure water from the entrained minerals and other potentially bad-tasting impurities. And quite aside from improving the sensory quality of water, the high temperatures involved in the process are sufficient to kill many types of potentially-harmful microorganisms. The prior art includes many distillers said to provide purified drinking water using distillation.

Aspects of distiller engineering practice relate to the control of electrical power in those types of distillers which use such power to heat water. It is common to employ some sort of thermostat to shut off the heater coil if the water level becomes undesirably low. And while the interrelationship of the raw water container, heater and thermostat is approached in different ways, such approaches are "condition-based." That is, control is premised upon the presence or absence of a particular condition, e.g., temperature or water level. Some examples will help illuminate the point.

U.S. Pat. No. 4,861,435 (Sweet, Jr.) recognizes that it is unwise to continue to operate the electric heater during the condition of undesirably-low feed water. A thermostat is mounted next to the heater to shut off such heater in that eventuality. A storage tank thermostat actuates a solenoid valve to pipe cold water into such tank if its temperature becomes too high.

U.S. Pat. No. 4,622,102 (Diebel) uses an approach to heater control that is based upon the condition of weight rather than water level. If the quantity of feed water diminishes to some level, the container support moves (under spring urging) and a valve opens to introduce more water. If the water becomes undesirably low, the container support moves a further distance and the distiller is shut down. It is apparent that Diebel distiller requires some minimum-but-significant level of raw water to start a distilling cycle.

Apparently, neither the Sweet, Jr. nor Diebel distillers make any provision for distiller shutdown in the event the heater is defective and produces no heat or too-little heat. Nor is there provision for shutting down the distiller in the event of a thermostat malfunction. And, seemingly, the Diebel distiller is too complex and costly for the typical household user.

Another aspect of certain prior art distillers is that they are difficult to clean. In the distiller disclosed in U.S. Pat. No. 4,269,663 (McFee), the heater, thermostat and raw water compartment are configured as an integral unit which is not intended to be disassembled by the user. The distiller of U.S. Pat. No. 4,110,170 (Kirschman et al.) seems particularly inconvenient to clean. At the least, one must remove the top-mounted preheat compartment with its condenser coil.

And a problem with certain known distillers is that they can "boil dry" or substantially dry. Boiling dry is undesirable (and the corollary, retaining a small amount of water in the boiling chamber, is desirable) because a dry boiling chamber collects mineral deposits or "scale." And such deposits are difficult or at least inconvenient to remove.

Yet another characteristic of at least the distiller shown in U.S. Pat. No. 3,935,077 (Dennison) is that the heater and fan are energized and de-energized simultaneously. The inventor did not appreciate how to dissipate distiller "top heat" while yet avoiding adding heat to the unit.

An improved electrical circuit and related method in which control does not rely exclusively upon a condition or set of conditions for operation, which recognize the possibility of an inoperative heater and which permits the associated distiller to be configured with a plug-in, easily-removable, easily-cleaned raw water container would be an important advance in the art.

OBJECTS OF THE INVENTION

It is an object of the invention to provide an improved circuit and method for a distiller that overcome some of the problems and shortcomings of the prior art.

Another object of the invention is to provide an improved circuit and method that use a parameter other than a particular condition, e.g., temperature or weight, to control a distiller.

Another object of the invention is to provide an improved circuit and method that employ redundant shutoff features.

Yet another object of the invention is to provide an improved circuit and method that retains a modest amount of water in the boiling chamber at the conclusion of water boiling.

Another object of the invention is to provide an improved circuit and method that are easy to use.

Still another object of the invention is to provide an improved circuit and method that permit configuring the raw water container and integral heater to be easily plug mounted for use and removed for occasional cleaning.

Another object of the invention is to provide an improved circuit and method requiring no particular minimum water level to start a distilling cycle.

Another object of the invention is to provide an improved circuit and method which dissipate distiller top heat while yet avoiding adding heat to the distiller.

Another object of the invention is to provide an improved circuit and method selected to shut down the distiller in the event of a thermostat malfunction. How these and other objects are accomplished will become apparent from the following descriptions and from the drawings.

SUMMARY OF THE INVENTION

The invention involves a distiller intended primarily for home use in purifying raw water, i.e., water drawn from the tap. The distiller includes a condensing coil that extracts heat from hot, vaporized water (i.e., steam) and thereby changes the water from its vapor to its liquid phase. The distiller also has an electrical control circuit and a heater connected to such circuit for heating water to its boiling point and vaporizing it to steam having a temperature above the boiling point. The first-described aspects of the new method involve steps used to distill a quantity of water during normal distiller operation.

The method for controlling power flow to the heater includes the steps of activating a timer circuit to energize the heater, increasing the temperature of the coil and bypassing the timer circuit when the coil temperature increases to a predetermined value which is referred to herein as the first coil temperature. The heater is de-energized when the heater temperature increases to a predetermined value. In a highly preferred method, the de-energizing step includes changing the state of a heater thermodevice in temperature-sensing relationship to the heater.

In a more specific aspect of the method, the heater temperature increases to such value only when the water in the raw water container approaches depletion. In that circumstance, water is no longer available in sufficient quantity to impart sufficient cooling effect to the heater and its immediate environs.

In other, more specific aspects of the invention, the timer circuit is activated during a first time interval, e.g., one-half hour, one hour or the like. The activating and bypassing steps are initiated at respective times which are separated by and define a second time interval which is less than the first time interval. The bypassing step includes changing the state of a coil thermodevice which is mounted in temperature-sensing relationship to the coil. In a specific embodiment, the state of the coil thermodevice changes from open to closed when the coil temperature rises to the first coil temperature, e.g., 160° F. The step of increasing the temperature of the coil includes flowing heated water vapor through the coil.

In other aspects of the new method, the distiller includes a fan in air flow relationship to the coil and the activating step includes energizing the fan when the timer circuit is activated. And the de-energizing step includes de-energizing the fan when the coil temperature declines to a second predetermined value, e.g., a second coil temperature of 155° F., for example. But whatever the numerical values of such temperatures, the second coil temperature is less than the first coil temperature. In a more specific aspect, the new method includes the step of disabling the entire control circuit (including the heater connected thereto) when the temperature of the coil declines to the second coil temperature.

Other aspects of the new method are used if distiller operation is initiated even though the raw water container has a scant amount of water or even no water therein. Initiation of distiller operation under such conditions is usually inadvertent. The method includes the steps of activating a timer circuit to energize the heater during a time interval. The temperature of the condensing coil is sensed and the heater is de-energized if at the end of the time interval, the coil temperature fails to increase to a predetermined value.

The new electrical circuit includes a normally-open electromagnetic relay having a relay coil and electrical contacts closed for energizing the heater when the relay coil is energized. A solid state switching device such as a transistor is provided for connecting the relay coil to a source of electrical power. A timer and a coil thermodevice are connected in parallel to the switching device and, more specifically, to the base of the transistor. The heater thermodevice is in series with the heater.

A START button activates the timer circuit which thereupon applies voltage to the base of the transistor, causing such transistor to switch to a conducting state. Transistor conduction energizes the relay coil and closes the relay contacts, thereby energizing the heater. Raw water is thereby heated and because of the heat in the resulting steam, the temperature of the condensing coil rises.

When the coil thermodevice reaches a predetermined temperature related to the temperature of the condensing coil, such thermodevice changes state (e.g., from open to closed) and continues to apply voltage to the base of the transistor even though the timer may "time out." And when the water in the container is substantially depleted, the temperature of the heater and heater thermodevice rise to levels above those prevailing when a substantial quantity of water is in the container. When the heater thermodevice reaches that temperature at which it changes state (e.g., from closed to open), the heater is de-energized.

Other aspects of the invention are set forth in the following detailed description and in the drawings.

DETAILED DESCRIPTIONS OF THE PREFERRED EMBODIMENTS

Figure 1:
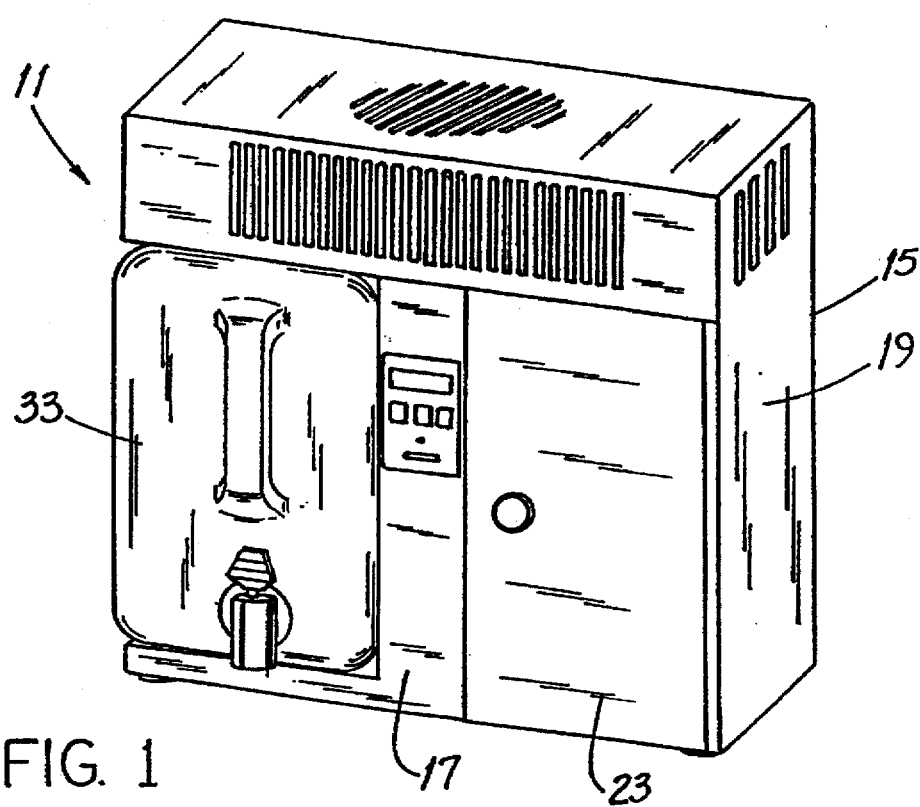
FIG. 1 is a perspective view of an exemplary distiller with which the new circuit may be used.
Figure 2:
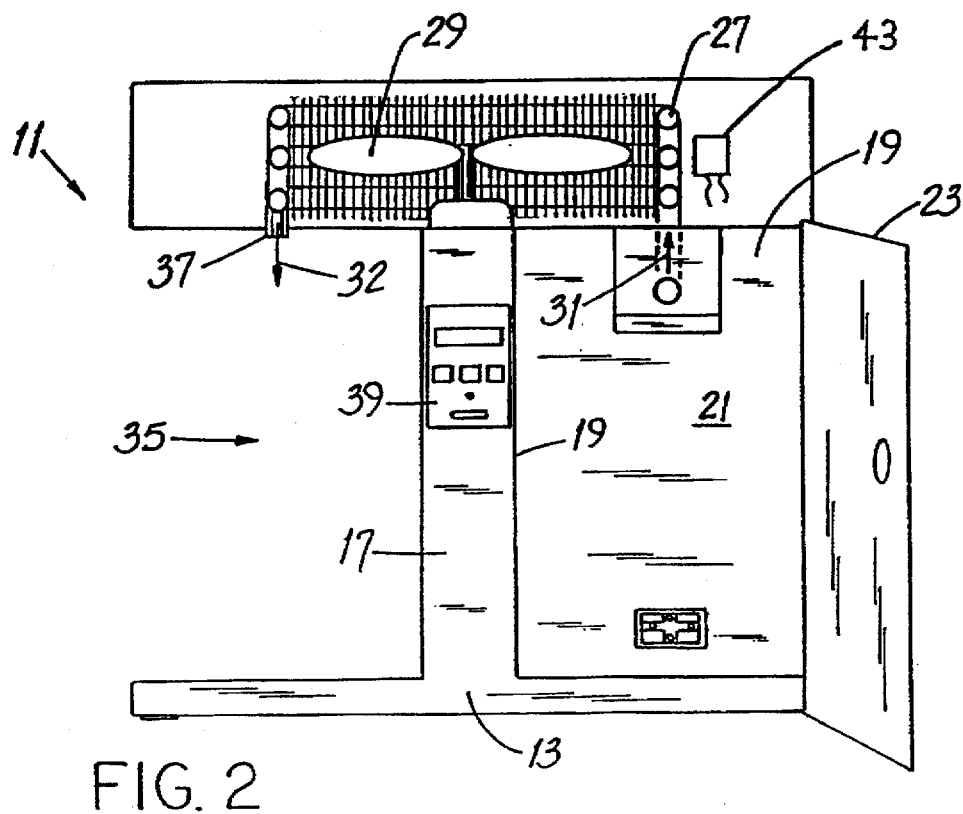
FIG. 2 is an elevation view of the distiller of FIG. 1 with the distilled-water-receiving vessel removed and the door open which otherwise covers the region for receiving a container of raw water.
Figure 3:
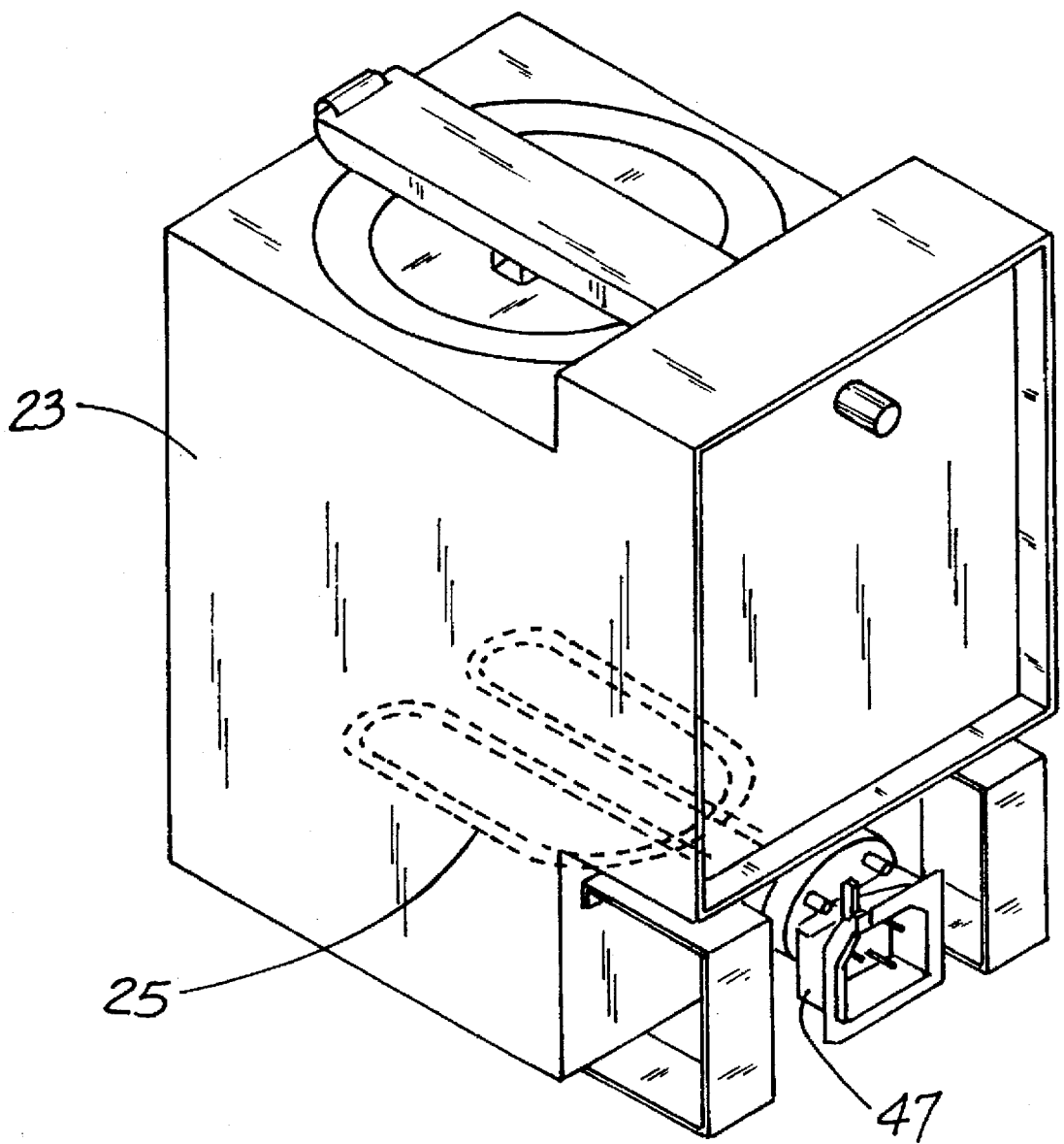
FIG. 3 is a perspective view of an exemplary raw water container useful with the distiller of FIGS. 1 and 2. Surfaces of parts are shown in dashed outline.

Before describing the new electrical circuit 10 and method, it will be helpful to have an understanding of some aspects of a distiller 11 with which the circuit 10 and method are particularly suited. Referring first to FIGS. 1-3, a distiller 11 has a base 13 and a housing 15 extending upwardly from such base 13. The housing 15 includes a central pedestal portion 17, walls 19 forming a container-receiving region 21 and a door 23 for enclosing such region 21. Raw water placed in the container 23 is evaporated by energizing the heater 25 and the resulting steam is condensed by a coil 27 cooled by a fan 29 in air flow relationship to such coil 27. The direction of fluid flow is as indicated by the arrows 31, 32. A vessel 33 is positioned in the location 35 and receives the distilled water dripping directly from the end 37 of the coil 27. The pedestal-mounted panel 39 includes controls for operating the distiller 11.

Figure 4:
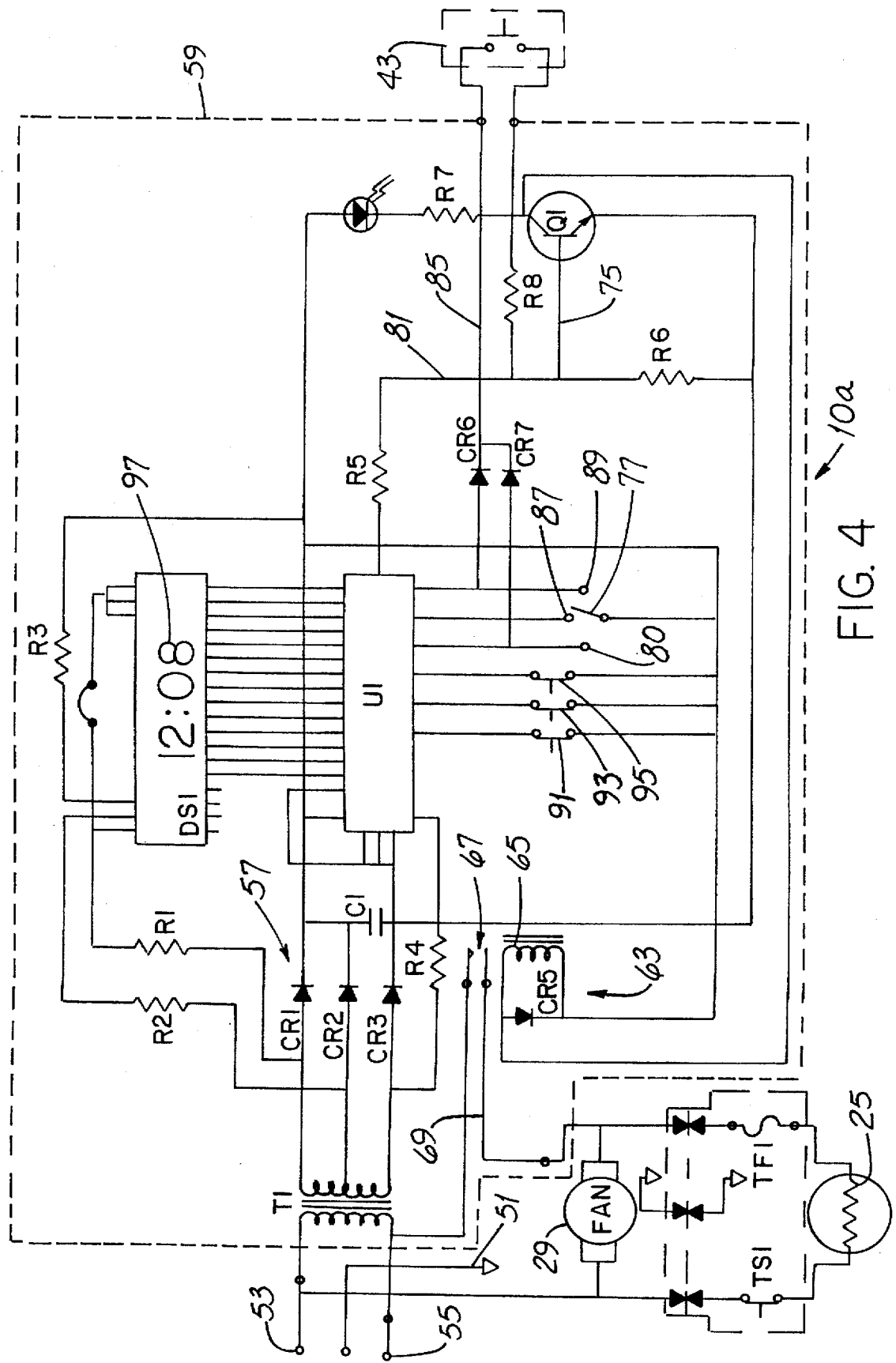
FIG. 4 is an embodiment of a distiller electrical circuit for use with 120 V power.
Figure 5:
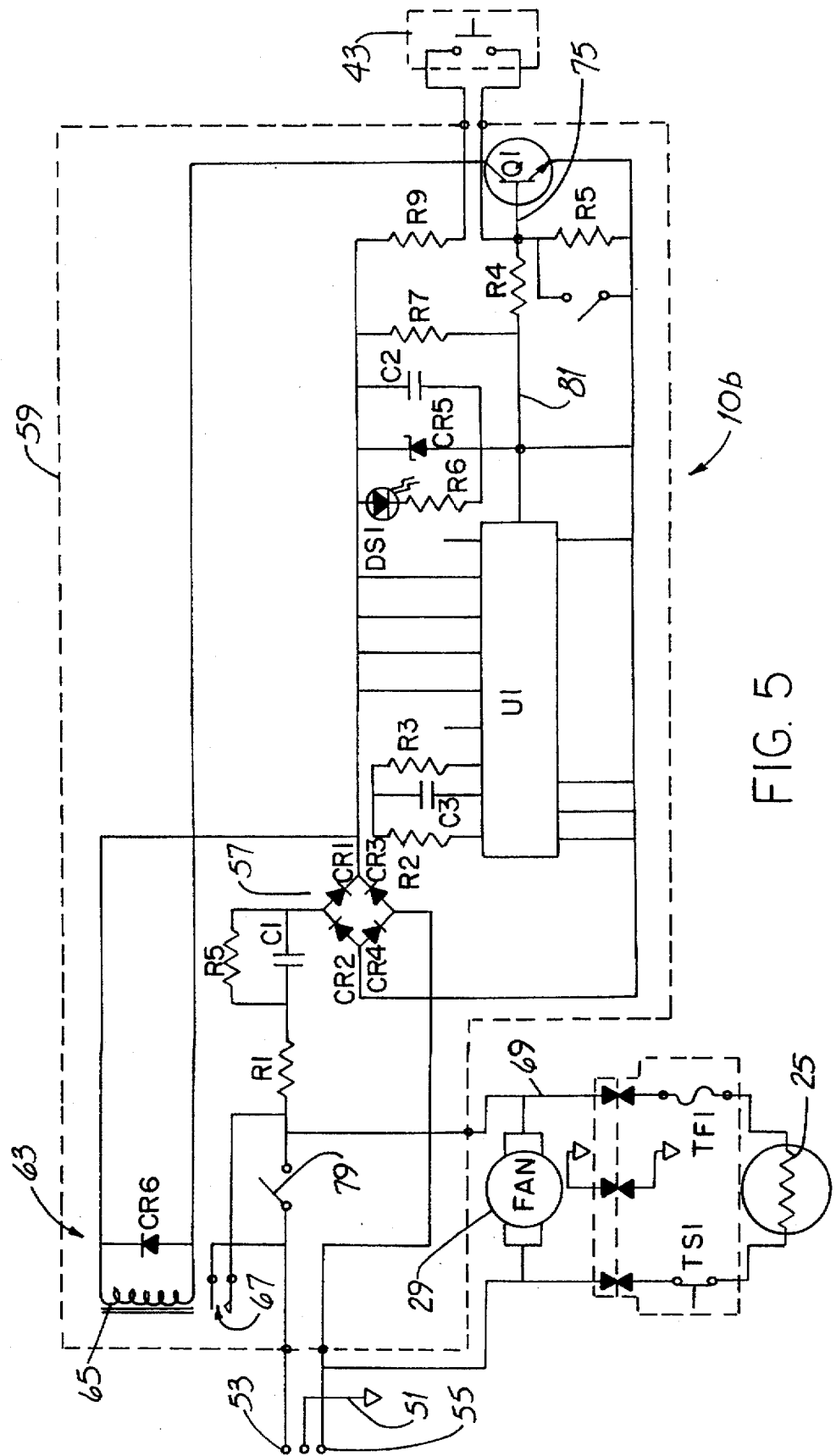
FIG. 5 is another embodiment of a distiller electrical circuit for use with 240 V power.

As shown in FIGS. 2, 4 and 5, there is a coil thermodevice 43 mounted in temperature-sensing relationship to the condensing coil 27. Such thermodevice 43 is of the bimetal type and is normally open at ambient temperature. When the temperature of the condensing coil 27 rises to some first predetermined value (because of steam being condensed to water therein), the thermodevice 43 closes. An exemplary first value is 160° F.

As shown in FIGS. 4 and 5, there is also a heater thermodevice TS1 mounted in temperature-sensing relationship to the heater 25. The thermodevice TS1, also of the bimetal type, is normally closed at ambient temperature. When the temperature of the heater 25 rises to some predetermined value (because there is insufficient water in the container 23 to maintain the heater 25 at a lower temperature), the thermodevice TS1 opens. In a highly preferred embodiment, such thermodevice TS1 is built into and forms an integral part of the terminating block 47 mounted on the raw water container 23.

It is to be appreciated that the term "temperature-sensing relationship" does not necessarily mean that the coil 27 and thermodevice 43 are at the same temperature or that the heater 25 and its thermodevice TS1 are at the same temperature. The term means that the temperatures of the thermodevices 43 and TS1 are generally proportional to the temperatures of the coil 27 and heater 25, respectively. It is also to be appreciated that using a normally-open coil thermodevice 43 and a normally-closed heater thermodevice TS1 are preferred. However, thermodevices 43, TS1, having the opposite normal state could be used, albeit at the expense and complexity of additional circuitry.

FIGS. 4 and 5 show two embodiments of the new electrical circuit 10, i.e., circuit 10a for 120 V power and circuit 10b for 240 V power. Each circuit 10a, 10b has a ground terminal 51 and two power terminals 53, 55. Rectifiers 57 provide DC power to a control section 59.

Each circuit 10a, 10b includes an electromagnetic relay 63 having a relay coil 65 and normally-open electrical contacts 67. When the relay coil 65 is energized, such contacts 67 close and electrical power along the line 69 energizes the heater 25. A solid state switching device such as a transistor Q1 is provided for connecting the relay coil 65 to a source of electrical power. A timer circuit U1 and the coil thermodevice 43 are connected in parallel to the transistor Q1 and, more specifically, to the base 75 of the transistor Q1. The heater thermodevice TS1 is in series with the heater 25.

In operation, the START button 79 of circuit 10b is momentarily depressed or the switch 77 of circuit 10a is moved to the MANUAL ON position 80. Either event activates the timer circuit U1 representing the beginning of first and second time intervals. Activation of such circuit U1 applies voltage along the line 81 to the base 75 of the transistor Q1, causing such transistor Q1 to switch to a conducting state. Transistor conduction energizes the relay coil 65 and closes the relay contacts 67, thereby energizing the heater 25 and, preferably, the fan 29. Raw water is thereby heated and because of the heat in the resulting steam, the temperature of the condensing coil 27 rises.

When the coil thermodevice 43 reaches a predetermined temperature related to the temperature of the condensing coil 27, such thermodevice 43 changes state (e.g., from open to closed) and such change of state represents the end of the second time interval. The closed thermodevice 43 bypasses the timer circuit U1 and continues to apply voltage from the line 85 to the base 75 of the transistor Q1 even though the timer circuit U1 "times out" at the end of the first time interval and the voltage on the line 81 diminishes to zero. (It is to be appreciated that in a highly preferred embodiment, the first time interval is predetermined by the circuitry in the timer circuit U1. Such time interval may be one-half hour, one hour or the like.)

When most of the water in the container 23 has boiled away (leaving only a small quantity of water in the container 23), such remaining small quantity has a diminished cooling effect on the heater 25. As a consequence, the temperature of the heater 25 and heater thermodevice TS1 rise to levels above those prevailing when a substantial quantity of water is in the container 23. When the heater thermodevice TS1 reaches that temperature at which it changes state (e.g., from closed to open), the heater 25 is de-energized. Preferably, the fan 29 is de-energized at the same time.

To explain certain of the above-described events in a somewhat different way, the activating and bypassing steps are initiated at respective times which are separated by and define a second time interval less than the first time interval. The bypassing step includes changing the state of the coil thermodevice 43 and the step of increasing the temperature of the coil 27 includes flowing heated water vapor (represented by arrow 31) through the coil 27.

When most of the water in the container 23 has boiled away as steam through the coil 27, the quantity of steam being produced steadily declines until insufficient steam is being produced to maintain the coil temperature at its first value. Such temperature declines to a second temperature, e.g., 155° F., and the coil thermodevice 43 opens and disables the control circuit 10a, 10b.

Other aspects of the new method are used if distiller operation is initiated (probably inadvertently) even though the raw water container 23 has a scant amount of water or even no water therein. It will be recalled that the coil thermodevice 43 is open until steam flows through such coil 27 and increases its temperature to the first value as noted above. But if there is no steam, the coil temperature does not rise appreciably and the thermodevice 43 does not close.

The method includes the steps of activating a timer circuit U1 to energize the heater 25 during a time interval, i.e., the first time interval noted above. The temperature of the condensing coil 27 is sensed and the heater 25 is de-energized if at the end of such interval, the coil temperature fails to increase to a predetermined value, i.e., the first predetermined value as noted above.

Referring particularly to FIG. 4, the circuit 10a differs only modestly from that of FIG. 5. The circuit a has a three-position switch 77 with a MANUAL ON position 80, an OFF position 87 and an AUTO position 89. When the switch 77 is at the AUTO position 89, the "hour set" button 91, the "minute set" button 93 and the "delay set" button 95 may be manipulated to cause the circuit a to be initiated at a future time. This is a useful feature, at least in those geographical areas where the price per kilowatt-hour of electrical power varies during a 24-hour day. The circuit 10a has a display DS1 including light-emitting diodes (LED) 97 for visually displaying time of day.

The following components are used in a specific embodiment of circuit 10a of FIG. 4:
TF1 THERMAL FUSE
C1 CAP. ELECTRO. 470 MFD 16 VDC
CR1-3 DIODE 1N4001 50 V. 1 A.
CR5 DIODE 1N4148 75 V. 0.2 A.
CR6-7 DIODE 1N4148 75 V. 0.2 A.
Q1 TRANSISTOR 2SC1815
DS1 L.E.D. DISPLAY SL-1008-27F
R1 RESISTOR 10 OHM ¼ W.

R2 RESISTOR 10K OHM ¼ W.
R3 RESISTOR 68 OHM ¼ W.
R4 RESISTOR 510K OHM ¼ W.
R5 RESISTOR 6.8K OHM ¼ W.
R6 RESISTOR 4.7K OHM ¼ W.
R7 RESISTOR 1 OHM ¼ W.
R8 RESISTOR 5.2K OHM ¼ W.
T1 TRANSFORMER PI-28-106
63 RELAY SRUDH-S-1090M1
U1 I.C. TMS3468NL

The following components are used in a specific embodiment of circuit 10b of FIG. 5:

TF1 THERMAL FUSE
C1 CAP. POLY. FILM 0.47 MFD 400 VDC
C2 CAP. ELECTRO. 33 MFD 16 VDC
C3 CAP. POLY. FILM 0.1 MFD 50 V
CR1-4 DIODE 1N4005 600 V. 1 A.
CR5 ZENER DIODE 1N4744A 15 V. 1 W.
CR6 DIODE 1N4148 75 V. 0.2 A.
TF1 THERMAL FUSE
R1 RESISTOR 100 OHM ½ W.
R2 RESISTOR 470K OHM ¼ W.
R3 RESISTOR 2M OHM ¼ W.
R4 RESISTOR 4.7K OHM ¼ W.
R5 RESISTOR 470 OHM ¼ W.
R6 RESISTOR 4.7K OHM ¼ W.
R7 RESISTOR 1.5K OHM ¼ W.
R8 RESISTOR 1M OHM ½ W.
R9 RESISTOR 4.7K OHM ¼ W.
Q1 TRANSISTOR MPS4124
DS1 L.E.D. LAMP TLR-114A
63 RELAY SRUDH-S-118DM
U1 I.C. MC14541BCP

While the principles of this invention have been described in connection with specific embodiments, it should be understood clearly that these descriptions are made only by way of example and are not intended to limit the scope of the invention.

What is claimed is:

1. In a distiller including a condensing coil and an electrically-powered water heater, a method for controlling power to the heater including the steps of:
   —activating a timer circuit to energize the heater;
   —increasing the temperature of the coil by indirectly transferring heat from the heater;
   —bypassing the timer circuit when steam passes through the coil and the coil temperature thereby increases to a predetermined value; and
   —de-energizing the heater when the heater temperature increases to a predetermined value above the predetermined value of the coil temperature.

2. The method of claim 1 wherein:
   —the timer circuit is activated during a first time interval; and
   —the activating and bypassing steps are initiated at respective times which define a second time interval; and
   —the second time interval is less than the first time interval.

3. The method of claim 2 wherein the increasing step includes flowing heated water vapor through the coil.

4. The method of claim 3 wherein the bypassing step includes changing the state of a coil thermodevice in temperature-sensing relationship to the coil.

5. The method of claim 1 wherein:
   —the distiller includes a fan in air flow relationship to the coil; and
   —the activating step includes energizing the fan.

6. The method of claim 1 wherein:
   —the distiller includes a fan in air flow relationship to the coil; and
   —the de-energizing step includes de-energizing the fan.

7. The method of claim 5 wherein the de-energizing step includes de-energizing the fan.

8. The method of claim 1 wherein:
   —the distiller includes an electrical control circuit having a coil thermodevice in temperature-sensing relationship to the coil;
   —the coil temperature of the bypassing step is a first coil temperature;
   and the method includes the step of:
   —disabling the control circuit when the temperature of the coil declines to a second coil temperature.

9. In a distiller including a condensing coil and an electrically-powered water heater, a method for controlling power flow to the heater including the steps of:
   —activating a timer circuit to energize the heater during a time interval;
   —sensing the temperature of the coil; and
   —de-energizing the heater if at the end of the time interval, the coil temperature fails to increase to a predetermined value.

10. An electrical circuit for controlling power to the electric heater of a distiller and including:
    —a relay having (a) electrical contacts for energizing the heater, and (b) a relay coil;
    —a solid state switching device for connecting the relay coil to a source of electrical power;
    —a timer connected to the switching device;
    —a coil thermodevice connected to the switching device and mounted in temperature-sensing relationship to the condensing coil; and
    —a heater thermodevice mounted in temperature-sensing relationship to the heater,
    and wherein:
    —the coil thermodevice switches between an open state and a closed state; and
    —the coil thermodevice bypasses the timer when the coil thermodevice is in the closed state.

11. The circuit of claim 10 wherein:
    —the switching device is a transistor having a base;
    —the timer and the coil thermodevice are connected in parallel to the base.

12. The circuit of claim 11 wherein the heater thermodevice is in series with the heater.

* * * * *